United States Patent Office 3,468,844
Patented Sept. 23, 1969

3,468,844
FLAME RESISTANT POLYARYLENE POLYETHERS
Charles N. Merriam, Martinsville, and Eleanor E. Saunders, Highland Park, N.J., assignors to Union Carbide Corporation, a corporation of New York
No Drawing. Filed Sept. 19, 1966, Ser. No. 580,207
Int. Cl. C08g 51/56; C09k 3/28
U.S. Cl. 260—45.75                        2 Claims

ABSTRACT OF THE DISCLOSURE

Flame resistant compositions free of halogen containing compounds comprising a polyarylene polyether and antimony oxide as the sole flame retardant are disclosed.

---

This invention relates to flame resistant polyarylene polyethers containing antimony oxide as the sole flame retardant.

Polyarylene polyethers of the class described herein are characterized by superior thermal properties as compared to other melt fabricable thermoplastic materials. At thickness greater than 75 mils they are self-extinguishing and non-dripping and thus meet the requirements for classification by Underwriters Laboratory (UL) in class 1. However at thickness less than 75 mils, these polyarylene polyethers are self-extinguishing but are not non-dripping and thus are classified in UL class 2.

It has now been discovered that polyarylene polyethers as described herein are rendered self-extinguishing and non-dripping at thicknesses of less than 75 mils and are more rapidly self extinguishing at thickness greater than 75 mils by admixing therewith from about 0.5 to about 5 parts by weight, based on the weight of the polyarylene polyether, of antimony oxide.

The ability of antimony oxide above to impart flame resistance to polyarylene polyethers is quite unexpected because it is known that when antimony oxide is used as a flame retardant in polymeric compositions, it is always used in conjunction with chlorine containing compounds either inherent or added. Modern Plastics Encyclopedia, 1966, page 471. Because antimony oxide must be used in conjunction with a chlorine or bromine containing organic compound to be effective as a flame retardant, it is necessary to add chlorinated paraffins, chlorinated biphenyls, polyvinyl chloride, or other chlorinated materials to polymeric compositions such as polyolefin based compositions which contain no chlorine. Modern Plastics, September 1965, page 99. The polyarylene polyethers used in this invention are free of halogen atoms on the polymer chain and do not contain added halogen containing compounds yet antimony oxide by itself is an effective flame retardant for these polyarylene polyethers.

Antimony oxide ($Sb_2O_3$) is a particulate crystalline material having a molecular weight of 291.52, a specific gravity of 5.2, and a melting point of 656° C. For purposes of this invention, it is preferred to employ antimony oxide having a particulate size of from about 0.5 to about 5 microns. Antimony oxide can also be coated on particulate materials such as silica and employed in the present invention with the same results as particulate antimony oxide.

Thermoplastic polyarylene polyethers used in the present invention are linear thermoplastic polymers having a basic structure composed of recurring units having the formula —O—E—O—E'— wherein E is the residuum of a dihydric phenol having no nuclear halogen substituents and E' is the residuum of a benzenoid compound having an inert electron withdrawing sulfone ($SO_2$) group in at least one of the positions ortho and para to the valence bonds and no nuclear halogen substituents, and where both of said residua are valently bonded to the other oxygens through aromatic carbon atoms.

The residua E and E' are characterized in this manner since they are conveniently prepared by the reaction of an alkali metal double salt of a dihydric phenol and a dihalobenzenoid compound as is described more fully herein.

The residuum E of the dihydric phenol is free of nuclear halogen substituents and can be, for instance, a mononuclear phenylene group as results from hydroquinone and resorcinol, or it may be a di- or polynuclear residuum. The residuum E can also be substituted with other inert nuclear substituents such as alkyl, alkoxy and like inert substituents.

It is preferred that the dihydric phenol be a weakly acidic dinuclear phenol such as, for example, the dihydroxy diphenyl alkanes which are commonly known as "bisphenols," such as, for example, the 2,2-bis-(4-hydroxyphenyl)propane, 1,1-bis-(4-hydroxyphenyl)-2-phenylethane, bis-(4-hydroxyphenyl)methane, and the like. Other suitable dinuclear dihydric phenols are the bisphenols of a symmetrical or unsymmetrical joining group as, for example, ether oxygen (—O—), carbonyl (—CO—), sulfide (—S—), sulfone (—SO_2—), or hydrocarbon residue in which the two phenolic nuclei are joined to the same or different carbon atoms of the residue such as, for example, the bisphenol of acetophenone, the bisphenol of benzophenone, the bisphenol of vinyl cyclohexene, the bisphenol of alpha-pinene, and the like bisphenols where the hydroxyphenyl groups are bound to the same or different carbon atoms of an organic linking group.

Such dinuclear phenols can be characterized as having the structure:

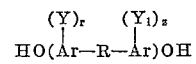

wherein Ar is an aromatic group and preferably is a phenylene group, Y and $Y_1$ can be the same or different inert substituent groups as alkyl groups having from 1 to 4 carbon atoms, or alkoxy radicals having from 1 to 4 carbon atoms, r and z are integers having a value of from 0 to 4, inclusive, and R is representative of a bond between aromatic carbon atoms as in dihydroxydiphenyl, or is a divalent radical, including for example, inorganic radicals as —CO—, —O—, —S—, —S—S—, —SO_2—, and divalent organic hydrocarbon radicals such as alkylene, alkylidene, cycloaliphatic, or the alkyl, aryl or like substituted alkylene, alkylidene and cycloaliphatic radicals as well as alkalicyclic, alkarylene and aromatic radicals and a ring fused to both Ar groups.

Examples of specific dihydric polynuclear phenols include among others: The bis-(hydroxyphenyl)alkanes such as 2,2-bis-(4-hydroxyphenyl)propane,
2,4'-dihydroxydiphenylmethane,
bis-(2-hydroxyphenyl)methane,
bis-(4-hydroxyphenyl)methane,
bis-(4-hydroxy-2,6-dimethyl-3-methoxyphenyl)methane,
1,1-bis-(4-hydroxyphenyl)ethane,
1,2-bis-(4-hydroxyphenyl)ethane,
1,1-bis-(3-methyl-4-hydroxyphenyl)propane,
1,3-bis-(3-methyl-4-hydroxyphenyl)propane,
2,2-bis-(3-phenyl-4-hydroxyphenyl)propane,
2,2-bis-(3-isopropyl-4-hydroxyphenyl)propane,
2,2-bis-(2-isopropyl-4-hydroxyphenyl)propane,
2,2-bis-(4-hydroxynaphthyl)propane,
2,2-bis-(4-hydroxyphenyl)pentane,
3,3-bis-(4-hydroxyphenyl)pentane, 2,2-bis-(4-hydroxyphenyl)heptane,
bis-(4-hydroxyphenyl)phenylmethane,
2,2-bis-(4-hydroxyphenyl)-1-phenylpropane,
and the like;

di(hydroxyphenyl)sulfones such as bis - (4 - hydroxyphenyl)sulfone, 2,4' - dihydroxydiphenyl sulfone, and the like; di(hydroxyphenyl) ethers such as bis-(4 - hydroxyphenyl)-ether, the 4,3'-, 4,2'-, 2,2'-, 2,3' - dihydroxydiphenyl ethers, 4,4' - dihydroxy - 2,6 - dimethyldiphenyl ether, bis-(4 - hydroxy - 3 - isobutylphenyl)ether, bis-(4 - hydroxy - 3 - isopropylphenyl)ether, bis(4 - hydroxynaphthyl) ether, 4,4' - dihydroxy - 3,6 - dimethoxyphenyl ether, 4,4' - dihydroxy - 2,5 - diethoxydiphenyl ether, and like materials.

It is also contemplated to use a mixture of two or more different dihydric phenols to accomplish the same ends as above. Thus when referred to above the E residuum in the polymer structure can actually be the same or different aromatic residua. As used herein, the E term defined as being the "residuum of the dihydric phenol" refers to the residue of the dihydric phenol after the removal of the two aromatic hydroxy groups. Thus it is readily seen that the polyarylene polyethers contain recurring groups of the residuum of the dihydric phenol and the residuum of the benzenoid compound bonded through aromatic ether oxygen atoms.

The residuum E' of the benzenoid compound can be from any dihalobenzenoid compound or mixture of dihalobenzenoid compounds which compound or compounds have the two halogens bonded to benzene rings having a sulfone group in at least one of the positions ortho and para to the halogen group. The dihalobenzenoid compound can be either mononuclear where the halogens are attached to the same benzenoid ring or polynuclear where they are attached to different benzenoid rings, as long as there is the sulfone group in the ortho or para position of that benzenoid nucleus.

Any of the halogens may be the reactive halogen substituents on the benzenoid compounds, fluorine and chlorine substituted benzenoid reactants being preferred.

If desired, the polymers may be made with mxitures of two or more dihalobenzenoid compounds. Thus the E' residuum of the benzenoid compounds in the polymer structure may be the same or different. It is seen also that the E' term defined as being the "residuum of the benzenoid compounds" refers to the aromatic or benzenoid residue of the compound after the removal of the halogen atoms on the benzenoid nucleus.

From the foregoing, it is evident that preferred linear thermoplastic polyarylene polyethers are those wherein E is the residuum of a dinuclear dihydric phenol having no nuclear halogen substituents and E' is the residuum of a dinuclear benzenoid compound having no nuclear halogen substituents. These preferred polymers are composed of recurring units having the formula

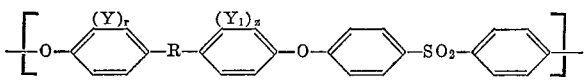

wherein R represents a member of the group consisting of a bond between aromatic carbon atoms and a divalent connecting radical and R' represents a member of the group consisting of sulfone, carbonyl, vinyl, sulfoxide, azo, saturated fluorocarbon, organic phosphine oxide and ethylidene groups and Y and $Y_1$ each represent inert substituent groups selected from the group consisting of alkyl groups having from 1 to 4 carbon atoms and alkoxy groups having from 1 to 4 carbon atoms and where $r$ and $z$ are integers having a value from 0 to 4 inclusive. Even more preferred are the thermoplastic polyarylene polyethers of the above formula wherein $r$ and $z$ are zero, R is divalent connecting radical

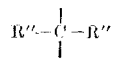

wherein R" represents a member of the group consisting of hydrogen, lower alkyl and lower aryl.

Thermoplastic polyarylene polyethers described herein can be prepared in a substantially equimolar one-step reaction of a double alkali metal salt of a dihydric phenol with a dihalobenzenoid compound in the presence of specific liquid organic sulfoxide or sulfone solvents under substantially anhydrous conditions. Any alkali metal salt of the dihydric phenol can be used as the one reactant.

The specific solvents employed have the formula $$R—S(O)_z—R$$

wherein each R represents a monovalent lower hydrocarbon group free of aliphatic unsaturation on the alpha carbon atom, and preferably contains less than about 8 carbon atoms or when connected together represents a divalent alkylene group with $z$ being an integer from 1 to 2 inclusive. In all of these solvents, all oxygens and two carbon atoms are bonded directly to the sulfur atom. Specifically mentionable of these solvents are dimethylsulfoxide, dimethylsulfone, diethylsulfoxide, diethylsulfone, diisopropylsulfone, tetrahydrothiophene 1,1-dioxide (commonly called tetramethylene sulfone or sulfolane), tetrahydrothiophene-1 monoxide, and the like.

Thermoplastic polyarylene polyethers described herein can also be prepared in a two-step process in which a dihydric phenol is first converted in situ in a primary reaction solvent to the alkali metal salt by the reaction with the alkali metal, the alkali metal hydride, alkali metal hydroxide, alkali metal alkoxide or the alkali metal alkyl compounds. This method of preparation is described in greater detail in Example 1 infra.

Admixing the polyarylene polyether and antimony oxide in any manner so long as a thorough blending is obtained. For example, admixing may be accomplished by a variety of methods normally employed for incorporation of plasticizers or fillers into thermoplastic polymers including but not limited to mixing rolls, doughmixers, Banbury mixers, extruders, and other mixing equipment. The resulting mixtures can be handled in any conventional manner employed for the fabrication or manipulation of thermoplastic resins. The mixtures can be molded using compression, injection, calendering and extrusion techniques.

It should be understood that the compositions of this invention may contain other additives to lubricate, prevent oxidation or lend color to the material. Such additives are well known in the art, and may be incorporated without departing from the scope of the invention.

Reduced viscosity (RV) was determined by dissolving a 0.2 gram sample of thermoplastic polyarylene polyether in chloroform contained in a 100 ml. volumetric flask so that the resultant solution measured exactly 100 ml. at 25° C. in a constant temperature bath. The viscosity of 3 ml. of the solution which had been filtered through a sintered glass funnel was determined in an Ostwald or similar type viscometer at 25° C. Reduced viscosity values were obtained from the equation:

$$\text{Reduced Viscosity} = \frac{t_s - t_o}{c \cdot t_o}$$

wherein:
$t_o$ is the efflux of the pure solvent
$t_s$ is the efflux time of the polymer solution
$c$ is the concentration of the polymer solution expressed in terms of grams of polymer per 100 ml. of solution.

Example 1.—Preparation of thermoplastic polyarylene polyether

In a 250 ml. flask equipped with a stirrer, thermometer, a water cooled condenser and a Dean Stark moisture trap filled with benzene, there were placed 11.42 grams of 2,2-bis-(4-hydroxyphenyl)-propane (0.05 moles), 13.1 grams of a 42.8% potassium hydroxide solution (0.1 mole KOH), 50 ml. of dimethylsulfoxide and 6 ml. benzene and the system purged with nitrogen to maintain an inert atmosphere over the reaction mixture. The mixture was refluxed for 3 to 4 hours, continously removing the water contained in the reaction mixture as an azeotrope with benzene and distilling off enough of the latter to give a refluxing mixture at 130–135° C. consisting of the dipotassium salt of the 2,2-bis(4-hydroxyphenyl)propane and dimethylsulfoxide essentially free of water. The mixture was cooled and 14.3 grams (0.05 mole) or 4,4'-dichlorodiphenylsulfone was added followed by 40 ml. of anhydrous dimethylsulfoxide, all under nitrogen pressure. The mixture was heated to 130° C. and held at 130–140° C. with good stirring for 4–5 hours. The viscous, orange solution was poured into 300 ml. water, rapidly circulating in a Waring Blendor, and the finely divided white polymer was filtered and then dried in a vacuum oven at 100° C. for 16 hours. The yield was 22.2 g. (100%) and the reaction was 99% complete based on a titration for residual base.

The polymer was composed of recurring units having the formula

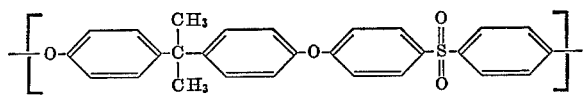

Example 2.—Flame resistant polyarylene polyethers

Polyarylene polyether prepared as described in Example 1 was tested according to the Underwriter's Laboratory tests for self-extinguishing plastics as described in the Underwriter's Laboratory Subject 94 Bulletin 0.1 of Dec. 9, 1959; Procedure and Requirements for Burning Tests of Basic Plastic Materials. The procedure requires 2 specimens each of two thicknesses 1/16" and 1/4" with 6" length and 1/2" width. A specimen is mounted vertically in a draft free chamber from the upper end and ignited from the lower end with a Bunsen burner adjusted to have a 3/4" blue flame. The ignition lasts for 10 seconds and the time of burning after removal of the burner is recorded. Immediately after flame out the specimen is reignited in the same way for 10 seconds and again the time to flame out is recorded. Any dripping of the specimen is also noted. The Underwriter's Laboratory class I limits total burning time to 30 seconds or less with no dripping. Class II limits burning time to 30 seconds or less but dripping can occur.

Burning time for the polymer in 1/4" thickness was less than 5 seconds with no dripping but the 1/16" samples averaged 20 second burning with dripping. The unmodified polymer is thus classified by Underwriter Laboratory as self-extinguishing class II.

One hundred grams of the polymer were then mixed with 1 gram of antimony oxide powder in a Braebender mixer at 240° C. for a period of 10 minutes. The mixture was molded in the required sample size for burning tests. The tests were carried out as described above. Total burning time for the 1/4" thickness was less than 2 sec. with no dripping. At 1/16" thickness burning time was 6 seconds with no dripping. The polymer containing 1% antimony oxide thus passes the requirements for Underwriters Laboratory self extinguishing class I.

Example 3

Polyarylene polyether as described in Example 1 was mixed as in Example 2 with 1%, 2%, 5% and 10% (by weight) of antimony oxide powder. All samples were self-extinguishing class I when tested by the burning test procedure described in Example 2.

Example 4

A series of compounds were prepared with polyarylene polyether as described in Example 1 by adding finely divided antimony oxide having an average particle size of 3 microns to 1/8" pellets of the polymer and tumbling for 10 minutes to disperse the fine powder. The mixture was extruded at 250° C. diced and molded into specimens for burning tests. Mixtures of 1/2%, 1%, 3% and 5% (by weight) Sb₂O₃ prepared in this way all were self-extinguishing class I.

Example 5

Antimony oxide powders having an average particle size of less than 1 micron were found to be effective flame retardant additives. Following Example 2, mixtures containing 1% of these antimony oxides were self-extinguishing class I.

Example 6

Polyarylene polyether prepared according to the procedure of Example 1 from hydroquinone and dichlorodiphenyl sulfone having the basic structure

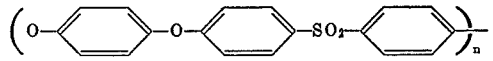

was found to be Underwriter's Laboratory self-extinguishing class II at 1/16" thick. The addition of 1% antimony oxide as described in Example 2 reduces burning time and eliminates dripping thereby meeting class I requirements.

Control

A polyarylene polyether composed of recurring units having the formula

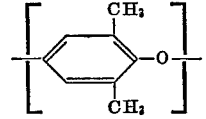

was unaffected in its burning rate by the addition of antimony oxide at 1, 3 and 5% (by weight) levels. No changes in burning times or dripping characteristics were observed.

What is claimed is:

1. Flame resistant composition free of halogen containing compounds comprising linear thermoplastic polyarylene polyether composed of recurring units having the formula

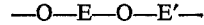

wherein E is the residuum of a dihydric phenol having no nuclear halogen substituents and E' is the residuum of a benzenoid compound having an inert electron withdrawing sulfone group in at least one of the positions ortho and para to the valence bonds and no nuclear halogen substituents, and where both of said residues are valently bonded to the ether oxygens through aromatic carbon atoms and from about 0.5 to about 5 parts by weight, based on the weight of said polyarylene polyether, of antimony oxide as the sole flame retardant.

2. Composition of claim 1 wherein said polyarylene polyether is composed of recurring units having the formula

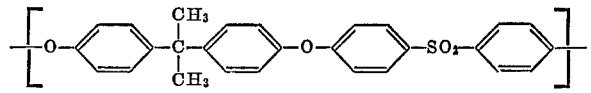

References Cited

UNITED STATES PATENTS 3,306,875   2/1967   Hay _____ 260—47

OTHER REFERENCES

Modern Plastics, September 1960, p. 408, vol. 38, No. 1A.

Flameproofing Textile Fabrics by Little, Reinhold Publishing Corp., New York, 1947, pp. 240, 241, 244, 245.

DONALD E. CZAJA, Primary Examiner

V. P. HOKE, Assistant Examiner

U.S. Cl. X.R.

260—45.7